Dec. 4, 1951 C. D. LAKE ET AL 2,577,083

READING UNIT FOR SMALL HOLES

Filed April 26, 1950 3 Sheets-Sheet 1

INVENTORS
CLAIR D. LAKE
WESLEY PFAFF
BY William Lang
ATTORNEY

Dec. 4, 1951 C. D. LAKE ET AL 2,577,083

READING UNIT FOR SMALL HOLES

Filed April 26, 1950 3 Sheets-Sheet 2

INVENTORS
CLAIR D. LAKE
WESLEY PFAFF
BY William Lang
ATTORNEY

Dec. 4, 1951 C. D. LAKE ET AL 2,577,083

READING UNIT FOR SMALL HOLES

Filed April 26, 1950 3 Sheets-Sheet 3

INVENTORS
CLAIR D. LAKE
WESLEY PFAFF
BY William Lang
ATTORNEY

Patented Dec. 4, 1951 2,577,083

UNITED STATES PATENT OFFICE 2,577,083

READING UNIT FOR SMALL HOLES

Clair D. Lake, Binghamton, and Wesley Pfaff, Endicott, N. Y., assignors to International Business Machines Corporation, New York, N. Y., a corporation of New York Application April 26, 1950, Serial No. 158,094

3 Claims. (Cl. 235—61.11)

This invention relates to a device for sensing perforations in record cards or tape form of card and more particularly to a device for sensing such designations while the record cards, or tapes are in motion through the card or tape feeding mechanism of well known accounting and statistical machines.

The principal object of the invention is to provide an improved sensing device wherein the sensing of a perforation effects closure of contacts for controlling machine operation.

A more specific object of the invention resides in the novel arrangement of elements comprising the sensing device, in which a cam controlled bell crank operates an actuator through mechanical means, said actuator in turn guiding a spring contact member to an electrical circuit closing position.

Other objects of the invention will be pointed out in the following description and claims and illustrated in the accompanying drawings, which disclose, by way of example, the principle of the invention and the best mode, which has been contemplated, of applying that principle.

*General description of the device*

Figures 1, 2:
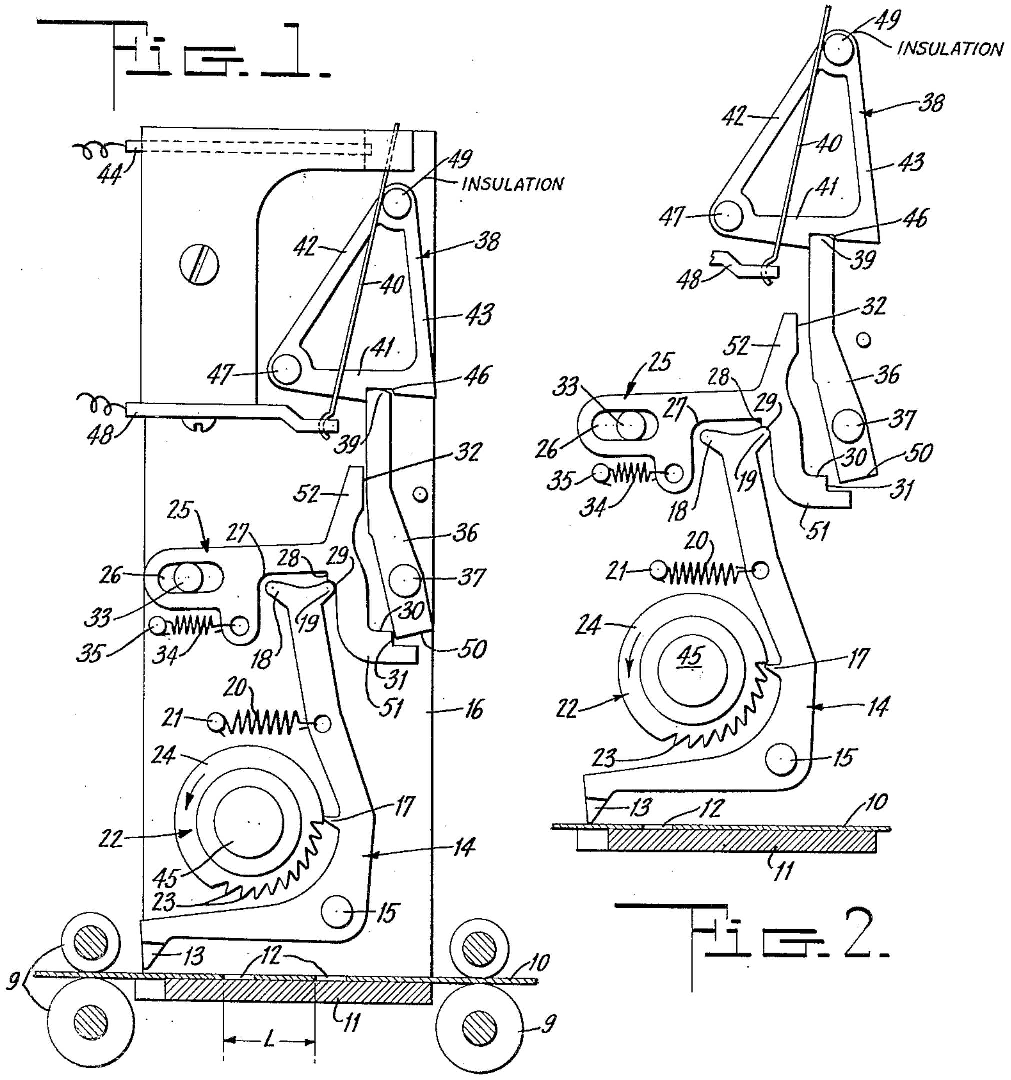
Fig. 1 is a detail view of the improved sensing device shown in relation to a perforated record card or tape at the beginning of the first cycle point.
Fig. 2 is a position view of the elements in the first cycle point as the card is tested for perforations.

Referring to the drawing, the record card feeding mechanism is diagrammatically represented by a pair of feeding rollers 9 which advance record card or tape 10 toward the left with a continuous movement across a supporting plate 11. The card or tape 10 has perforations 12 arranged in the usual columns and rows according to the data their location represents.

In line with each column of perforations 12 is a sensing finger 13 united with bell crank 14 which is pivoted on a pin 15 which in turn is secured to base plate 16. Bell crank 14 has a tooth 17 formed thereon and a bifurcated portion having contact arms 18 and 19. A spring 20 extending between the bell crank 14 and stationary pin 21 urges said bell crank in a counterclockwise direction about pivot pin 15.

Ratchet cam 22 mounted on shaft 45 is rotated continually in a counterclockwise direction and its speed is synchronized with the movement of card 10 as it passes underneath the sensing finger 13. The ratchet portion of cam 22 comprises teeth 23, the number of which depend entirely upon the code being used and can be designed to accommodate any number or combinations of holes applying to a specific code. The distance L between successive holes of card 10 is such that each time a hole passes the sensing finger 13, a tooth 23 passes bell crank tooth 17. A continuous cam surface 24 extends between the endmost teeth 23 of said ratchet portion of cam 22 and serves to keep the tooth 17 of bell crank 14 out of engagement with cam teeth 23 thereby maintaining said bell crank in an inoperative position between card cycles. The interval between the lowest perforating rows of successive cards is termed a cycle of operation of the machine.

An interposer 25 is positioned slightly above bell crank 14. Said interposer comprises a bifurcated end portion having arms 51 and 52 and an opposite end portion having a slot 26 which engages a stationary pivot pin 33. Spring 34 extending between the interposer 25 and stationary pin 35 urges said interposer to move to the left, as viewed in Figs. 1–7, until interference with pivot pin 33 occurs, thereafter the interposer is urged in a clockwise direction until the bell crank arms 18 and 19 are engaged by interposer contact surfaces 27, 28 or 29. Arms 51 and 52 are provided with contact surfaces 30, 31 and 32 for engaging and positioning a latch member 36.

Latch member 36 is positioned to the right of interposer 25 and pivoted on stationary pin 37. The upper portion of said latch member has a cam surface portion 39 which engages an actuator 38. Said actuator is triangular in shape having a base portion 41 with a slot 46 therein and legs 42 and 43. At the junction point of the base 41 and leg 42, it is pivoted to a stationary pin 47. An insulated block 49 is attached at the junction point of legs 42 and 43 and serves to support the free end of a spring contact member 40, pivotally anchored to an input terminal 48. When actuator 38 is displaced in a counterclockwise direction about pin 47, insulated block 49 moves spring contact member 40 against output terminal 44 thereby completing an electrical circuit between input terminal 48 and output terminal 44. For its operation, actuator 38 is controlled by latch member 36 which in turn is positioned by the interposer 25 as a result of engagement with bell crank 14.

By virtue of its position and its contact surfaces, interposer 25, cooperating with latch member 36 and actuator 38, brings about a contact duration between spring contact member 40 and output terminal 44 of substantially a machine cycle point for a single hole in the card.

For two holes which are adjacent the interposer 25 brings about a contact duration between contact member 40 and output member 44 for an uninterrupted duration of substantially two machine cycle points. Thus for any particular number of holes adjacently positioned in the card, contact duration remains uninterrupted until a position is reached where no hole appears.

*Operation of the device*

Referring now to Fig. 1, as the position of the card related to the first cycle point is being tested, the tooth 17 of bell crank 14 engages the continuous surface portion 24 of ratchet cam 22, which is rotated continually in a counterclockwise direction, thereby maintaining said bell crank in its normal inoperative position. With bell crank 14 in such a position, arm 19 engages interposer surface 29 and latch member 36 lies in a substantially vertical plane with its upper cam portion 39 seated in slot 46 of actuator 38. The free end of spring contact member 40 rests upon insulation block 49 which is positioned a short distance from contact terminal 44.

As bell crank tooth 17 drops off the continuous surface portion 24 of cam 22, bell crank 14 is urged in a counterclockwise direction, about pivot pin 15, by spring 20. In the absence of a perforation at this time, sensing finger 13 rides on the surface of record 10 and bell crank 22 assumes the position shown in Fig. 2. (Wherein it is seen that under the influence of springs 34 and 20, bell crank 14 is reclosed and 25 is shifted, etc.—while maintaining 19 in 29.)

Figures 3, 4, 5:
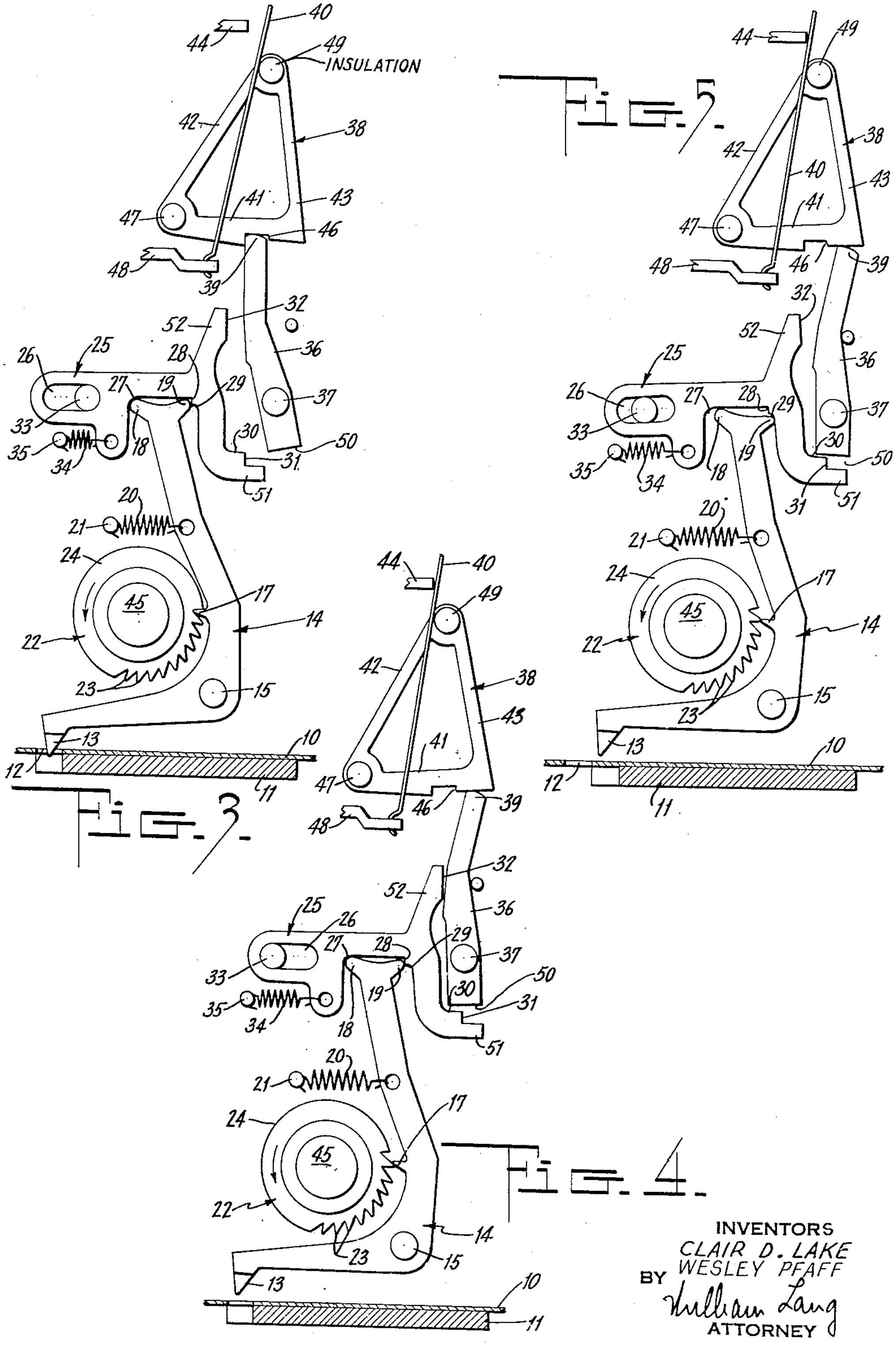
Fig. 3 is a position view of the elements in the first cycle in which a perforation is sensed by the bell crank finger.
Fig. 4 is a position view of the elements as the first cycle point draws to a close.
Fig. 5 is a position view of the elements at the end of the first cycle.

However, if a perforation is sensed by finger 13, bell crank 14 is permitted greater counterclockwise displacement than allowed by the absence of the hole in the card thereby enabling interposer 25, urged by spring 34, to move to its left until interference with pivot pin 33 by a side of slot 26 occurs as shown in Fig. 3. Thereafter, a slight counterclockwise rotation of said interposer 25 follows as bell crank arm 19 slides from contact with interposer contact surface 29 to a new position in which arm 19 engages surface 28, arm 18 engages surface 27 and contact surface 31 is below the level of surface 50. Concurrently, interposer contact surface 32 is placed in a tentative interfering position with latch member 36 as surface 31 assumes a non-interfering position with said latch member.

As the cycle point advances, ratchet cam 22 again cooperates with tooth 17 to restore in a clockwise direction the bell crank 14, and interposer 25 is in turn displaced to the right because of the pressure of arm 19 against contact surface 28. Concurrently, interposer 25 is displaced slightly in a counterclockwise direction as a result of the camming action between arm 18 and contact surface 27.

Referring now to Fig. 4, the movement of interposer 25 at surface 32 causes latch member 36, pivoted about pin 37, to be displaced in a clockwise direction. Cam surface 39 of latch member 36 moves out of actuator slot 46 to displace actuator 38 counterclockwise about its pivot pin 47 and guide spring contact member 40 into contact with electrical output terminal 44. Thus, an electrical impulse may be passed from input terminal 48 through contact member 40 to the fixed output terminal 44.

Referring now to Fig. 5, as the cycle point advances, the continued clockwise rotation of bell crank 14 causes interposer 25 to be further displaced counterclockwise, by means of arm 18 cooperating with contact surface 27, to a position in which arm 19 engages but does not lie seated in surface 29. Then, interposer 25 is urged to the left by spring 34 and a counterclockwise displacement takes place until surface 29 is brought into complete contact with finger 19. At the end of the cycle point, latch member 36, actuator 38 and spring contact member 40 remain in their displaced positions and contact surface 32 of interposer 25 is therefore unable to engage latch member 36 for the following cycle point.

Figure 6:
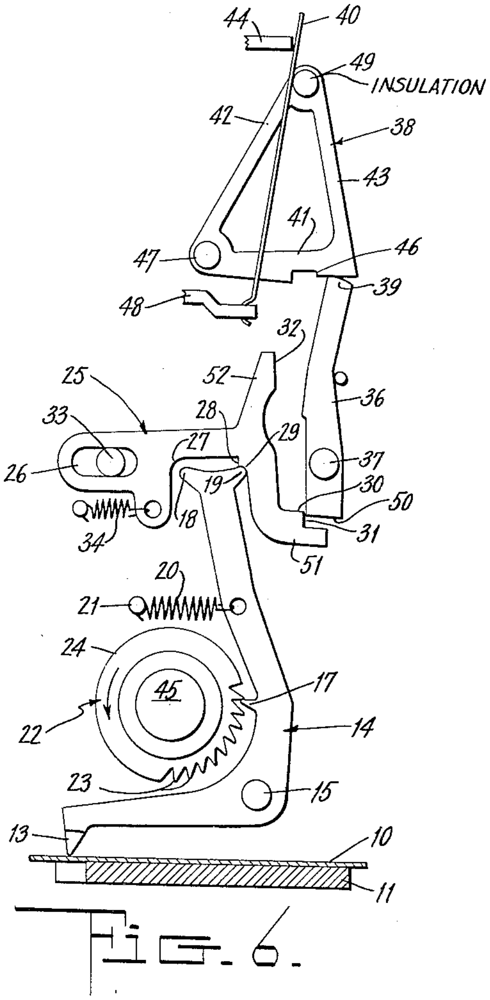
Fig. 6 is a position view of the elements at the beginning of the second cycle point in the absence of a perforation in the record card or tape.

Referring now to Fig. 6, in the absence of a perforation in the card at the beginning of the second cycle point, as tooth 17 drops off cam tooth 23, bell crank 14 is urged in a counterclockwise direction by spring 20 as previously explained. Concurrently, interposer 25, urged by spring 34, is displaced counterclockwise as arm 19 applies pressure to contact surface 29. This movement of said interposer 25 enables surface 30 to move from beneath surface 50 and brings surface 31 above the level of surface 50 so that it is in a position to engage latch member 36 upon a displacement to the right of the interposer 25 and thereby restore actuator 38 to the circuit breaking position.

Figure 7:
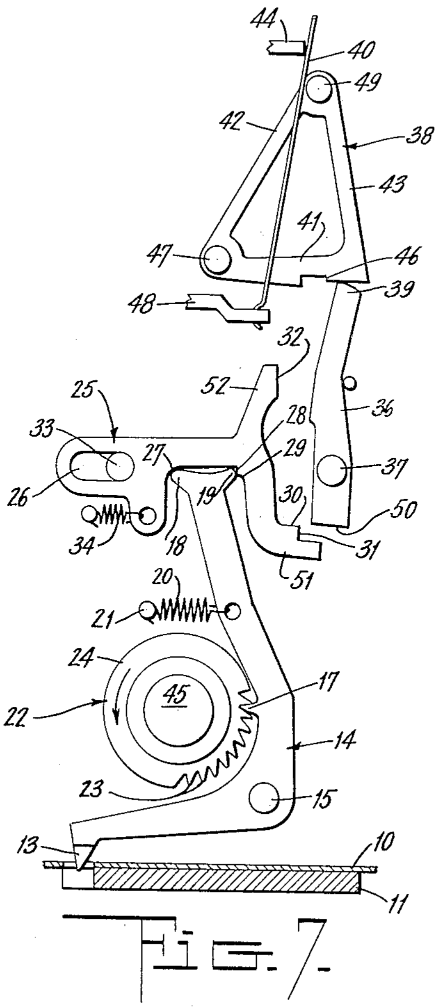
Fig. 7 is a position view of the elements in the second cycle in which a perforation is sensed by the bell crank finger.

However, if a perforation exists in the card 10 at the time the second cycle point is being tested, bell crank 14 is permitted a greater counterclockwise displacement than allowed by the absence of a hole in card 10. The differential is displacement enables interposer 25 to assume an engaging position wherein arms 18 and 19 of bell crank 14 are in contact with surfaces 27 and 28 respectively of said interposer. In this arrangement of elements, as shown in Fig. 7, surface 30 is below surface 50 of latch member 36, therefore surface 31 will not cooperate with said latch member in the ensuing operation of interposer 25 to move it counterclockwise until cam surface 39 is again seated in actuator slot 46 and spring contact 40 has broken contact with terminal 44.

As tooth 17 cooperates with a tooth 23 of cam 22, bell crank 14 moves clockwise and in turn interposer 25 is moved to the right and counterclockwise by the action of arms 18 and 19 working against contact surfaces 27 and 28 respectively. During this action of interposer 25 no motion is imparted to latch member 36 for the reasons mentioned above. Thus it is seen that at the end of the second cycle point, elements 36, 38 and 40 remain in their displaced positions and contact between spring contact member 40 and output terminal 44 is maintained.

Figure 8:
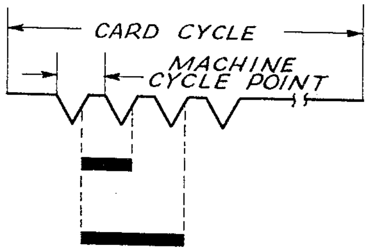
Fig. 8 is a chart relationship of contact and cycle point timing.

Referring now to Fig. 8, the contact duration of contact member 40 and output terminal 44 is substantially equivalent to the duration of one cycle point for a single perforation in the card. In the case of two adjacent perforations or more, contact duration between said members is uninterrupted between the cycle point and duration remains constant until a cycle point position is reached wherein no perforation appears.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record sensing mechanism, comprising a sensing element normally biased into sensing relationship with respect to a record having a series of spaced index point positions, means for advancing said record, to cause the positions to pass the sensing element in successive order, a circuit closing device, a power element effective to cause the sensing element to sense the positions in succession and effective further upon sensing a perforation in any position, to close the circuit closing device through the sensing element and reopen it during the sensing of the next succeeding position, and means effective in response to the presence of a perforation in said succeeding position for preventing the reopening of said circuit closing device, whereby the sensing of two holes in succession results in continued closure of said closing device for a period equal to that required for two successive full displacements and restorations of said sensing element and a sensing of the next following position.

2. A sensing device for a perforated record card comprising a sensing bell crank having a sensing finger portion and a tooth portion, a continually rotating cam provided with a continuous surface portion and a ratchet portion, spring means for biasing the bell crank tooth portion against said continuous cam surface, said tooth portion dropping off said continuous surface at a predetermined point in the machine cycle causing the bell crank sensing finger to rest upon the surface of a moving card in which perforations are located to pass said sensing finger, occurrence of a perforation at the sensing finger causing the finger to drop into the perforation and a displacement of the bell crank, a spring contact member, an actuator for guiding said spring contact member to a circuit closing position, continued rotation of said cam causing the ratchet and the bell crank tooth portion to cooperate to effect a restoring displacement of said bell crank, and means operable by the bell crank for positively activating said actuator, comprising an interposer with bell crank connecting surfaces and a latch member having a cam portion engaging the actuator, said interposer positioning the latch member in cooperation with a bell crank displacement, the latch member in turn activating said actuator.

3. In a device of the class described, a sensing element having a sensing finger portion and a tooth portion, means for moving a record having a series of spaced index point positions to pass said sensing finger with the index positions in successive order, a spring contact member, an actuator for guiding said spring contact member to a circuit closing position, means for cooperating with said sensing element tooth portion to cause the sensing finger to sense the positions in succession and effective further upon sensing a perforation in any position, to actuate said actuator thereby closing a circuit and restore said actuator during the sensing of the next succeeding position whereby said circuit is opened, and means effective in response to the presence of a perforation in said succeeding position for preventing the restoring of said actuator, whereby the sensing of two holes in succession results in continued closure of said circuit for a period equal to that required for two successive full displacements and restorations of said sensing element and a sensing of the next following position.

CLAIR D. LAKE.
WESLEY PFAFF.

REFERENCES CITED

The following references are of record in the file of this patent:

UNITED STATES PATENTS

| Number | Name | Date |
|---|---|---|
| 1,516,772 | La Boiteaux | Nov. 25, 1924 |
| 2,093,731 | La Boiteaux | Sept. 21, 1937 |
| 2,490,346 | Furman | Dec. 6, 1949 |